United States Patent
Schulz et al.

Patent Number: 6,007,290
Date of Patent: Dec. 28, 1999

[54] LIFTABLE DUAL CARGO PLATFORMS FOR A MOTOR HOME

[76] Inventors: Siegfried Schulz; Nathan P. S. Schulz, both of 62 Watergate, South Barrington, Ill. 60010

[21] Appl. No.: 09/129,587

[22] Filed: Aug. 5, 1998

Related U.S. Application Data

[60] Provisional application No. 60/055,587, Aug. 12, 1997.

[51] Int. Cl.[6] .................................................. B60P 3/00
[52] U.S. Cl. .............................................. 414/462; 414/540
[58] Field of Search .................................. 414/462, 540; 224/519, 521

[56] References Cited

U.S. PATENT DOCUMENTS

| | | | |
|---|---|---|---|
| 3,174,634 | 3/1965 | Peck | 414/540 X |
| 3,282,449 | 11/1966 | Buford | 414/540 |
| 5,011,361 | 4/1991 | Peterson | 414/462 |

*Primary Examiner*—Janice L. Krizek
*Attorney, Agent, or Firm*—Dorn, McEachran, Jambor & Keating

[57] ABSTRACT

A lift mechanism for mounting on the back of a motor vehicle having a trailer hitch. It includes a rearwardly extending tube mounted on the trailer hitch. A main hoist column is upstanding on the rearwardly extending tube. The main hoist column has an upper end which is attached to the back of the motor by a connection which allows both pivotal and back and forth movement of the upper end. First and second platforms are mounted by sleeves to move up and down on the main hoist column with the sleeves guided by rollers. Each platform can be swung between a horizontal position and a vertical position. An electric motor driven drum is provided for each platform with a cable wound around each drum having an end connected to its respective platform. A removable extension attaches to the rearwardly extending tube to provide a lower extension for the main hoist column.

16 Claims, 11 Drawing Sheets

LIFTABLE DUAL CARGO PLATFORMS FOR A MOTOR HOME

This application claims benefit of Provisional application 60/055,587, filed Aug. 12, 1997.

BACKGROUND AND SUMMARY OF THE INVENTION

Operators of motor homes frequently carry motorcycles, motor scooters, bikes, wheel chairs, four wheel scooters and similar small vehicles for local transportation when the motor home is parked at a vacation facility and connected to power, water and sanitary services. Conventionally, these small vehicles, when feasible, were manually lifted onto carrier racks attached to the rear of a motor home. For all but the lightest vehicles, this lifting was a strenuous task.

This invention is directed to a motorized lift mechanism for storage platforms which can be mounted on the rear of a motor home.

More specifically, this invention is directed to a motorized lift mechanism which provides carrier platforms capable of lifting and storing small motor vehicles on a motor home.

Further, this invention is directed to a motorized lift mechanism which can be supported on a trailer hitch of the type conventionally found on motor homes.

Yet another aspect of this invention is a motorized lift mechanism for dual platforms which platforms can be lowered to the ground to facilitate loading of motor vehicles thereon and raised high off the ground during travel of the motor home.

Another feature of the invention is storage platforms which may be folded flat during non-use.

Still another aspect of the invention is to provide covers for the motor vehicles stored on the storage rack to prevent the accumulation of dirt and dust.

Finally, the motorized lift mechanism of this invention provides a pair of storage platforms each vertically movable independently of the other.

Other advantages of the invention will be found in the following specification and drawings of this application.

BRIEF DESCRIPTION OF THE DRAWINGS

The drawings of this invention show the motorized lift mechanism mounted on the rear of a motor home or similar vehicle in a somewhat schematic manner.

DESCRIPTION OF THE PREFERRED EMBODIMENT

Figure 1:
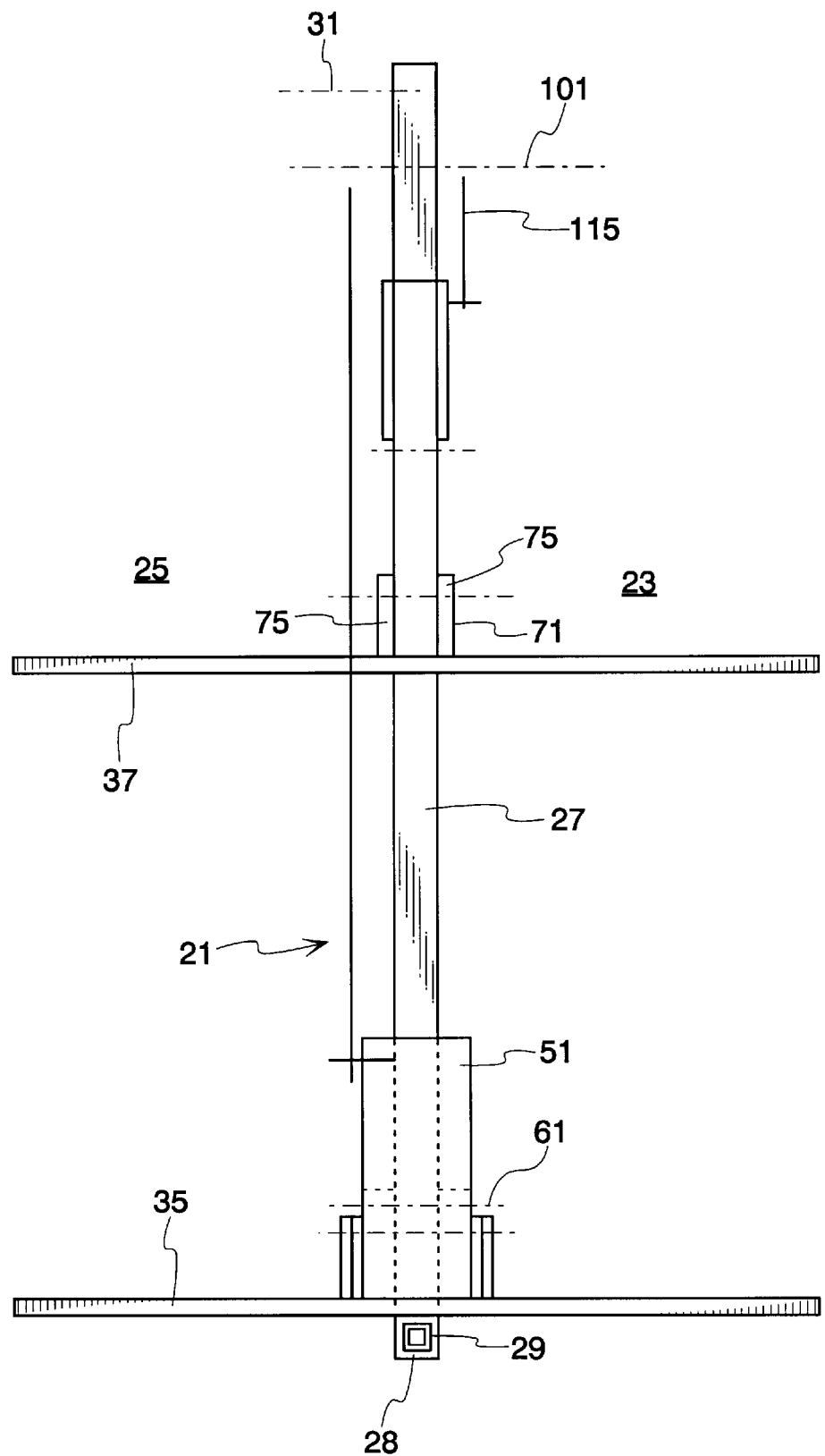
FIG. 1 is an elevational view looking forwardly from the rear of a motor home showing portions of the lift mechanism mounted on the trailer hitch of the motor home with the remainder of the motor home omitted for clarity of illustration.

The cargo platform lift mechanism 21 of the invention is shown in the drawings as adapted for mounting on the rear wall 23 of a motor home 25 or similar vehicle. It includes a main hoist column 27 shown in elevational view, for example in FIGS. 1 and 2, and in a transverse cross sectional view in FIG. 4. This column 27 may be formed of rectangular tubular metal, preferably aluminum, although lightweight metals of other types may be used. As shown most clearly in FIGS. 1, 2 and 9 of the drawings, the lower end of the main hoist column 27 is supported on a rectangular tubular extension 28 which telescopes over and attaches to the trailer hitch 29 as shown in detail in FIG. 9 of the drawings. The upper end of the main hoist column 27 is connected to the rear wall 23 of the motor home 25 by a top mount 31 shown schematically in FIGS. 1 and 2 of the drawings and in detail in FIGS. 7 and 8 of the drawings. Further, as shown in detail in FIG. 9 of the drawings, an extension 33 is attached to the underside of the trailer hitch extension 28 to extend the effective vertical length of the main hoist column 27 for reasons to be hereinafter explained.

Figure 3:
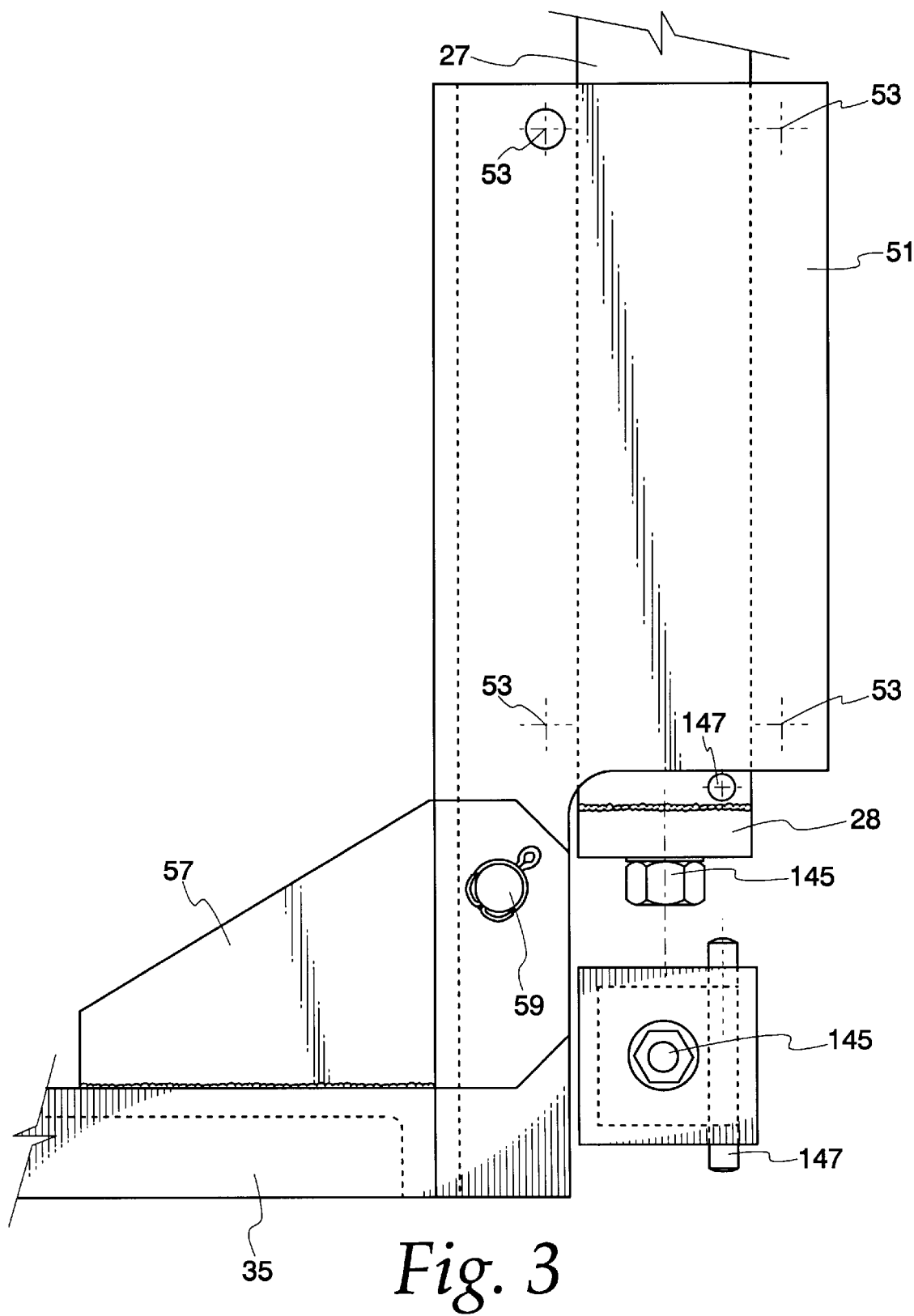
FIG. 3 is an enlarged partial side elevational view of the lower lift platform with parts broken away, other parts omitted for clarity of illustration, the folding movement of the platform indicated by arrows and a partial bottom view of the lift mechanism indicated by a view labeled "A"
Figure 4:
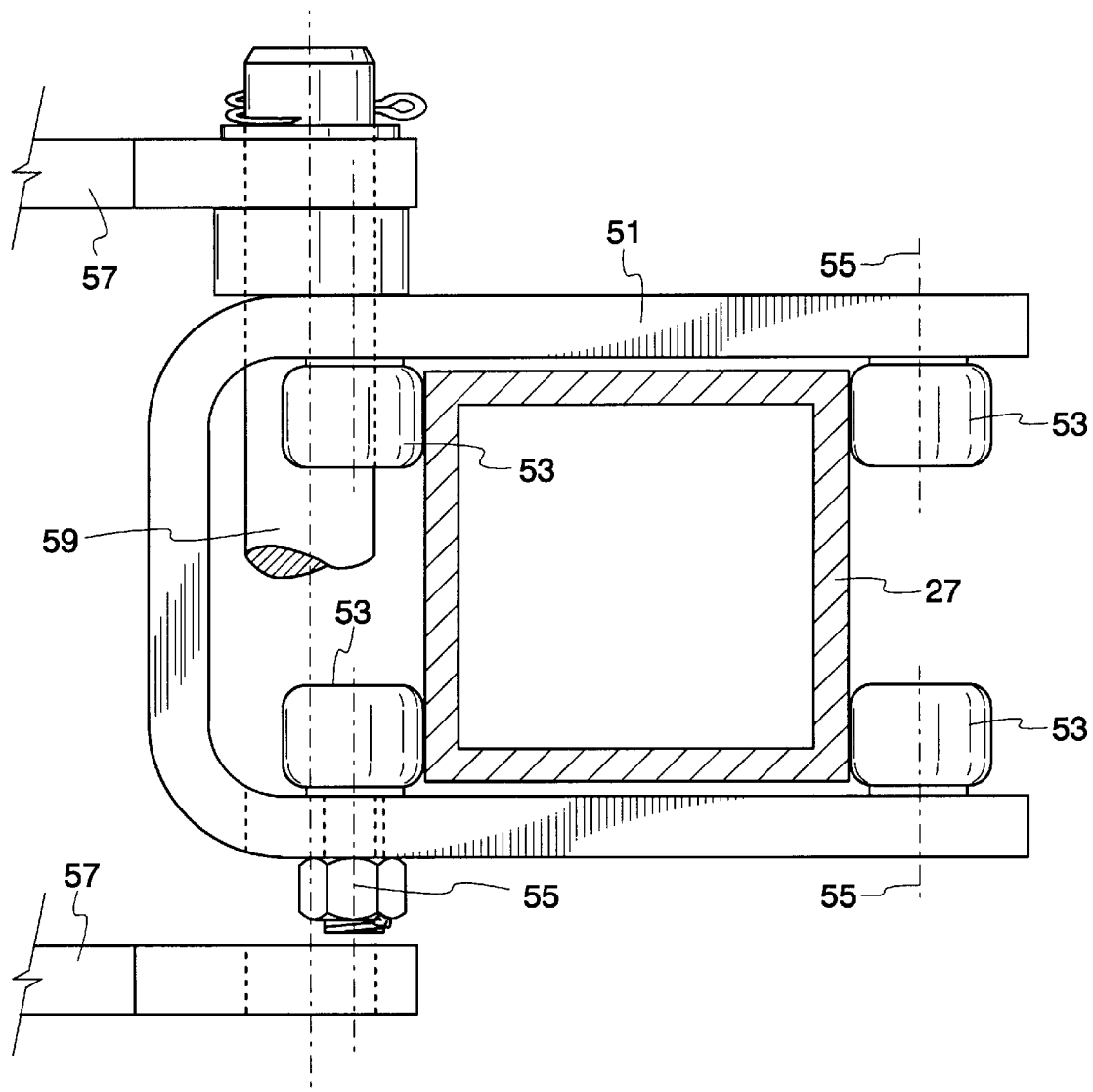
FIG. 4 is a partial, top plan view of the lift mechanism with some parts shown in cross section, other parts broken away and showing the mounting of the lower lift platform on the main column of the lift mechanism.
Figure 5:
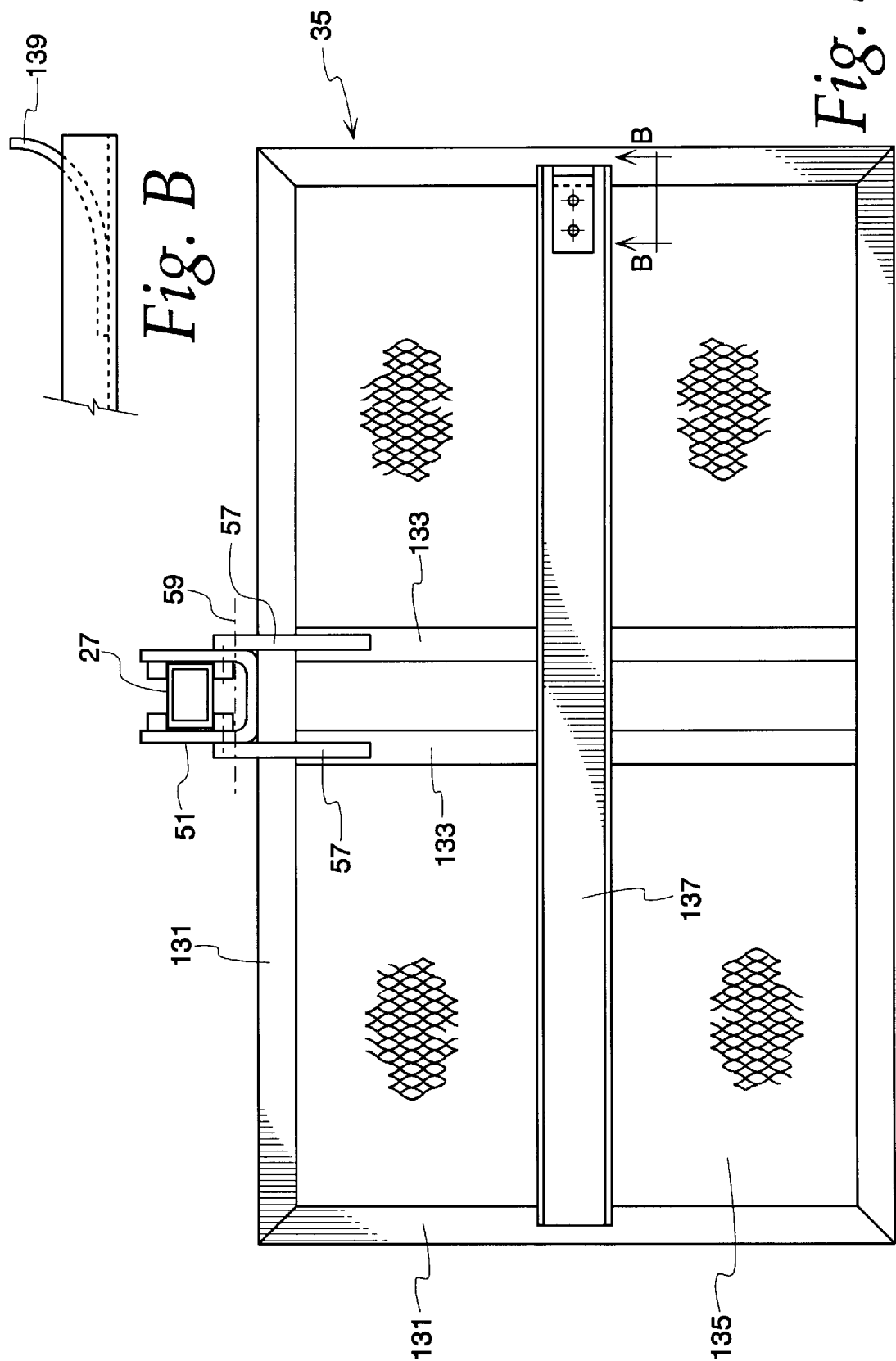
FIG. 5 is a top plan view of the lower lift mechanism and lower support platform with an auxiliary view "B" showing a tire stop to block a wheel of a vehicle supported on the center channel.
Figure 10:
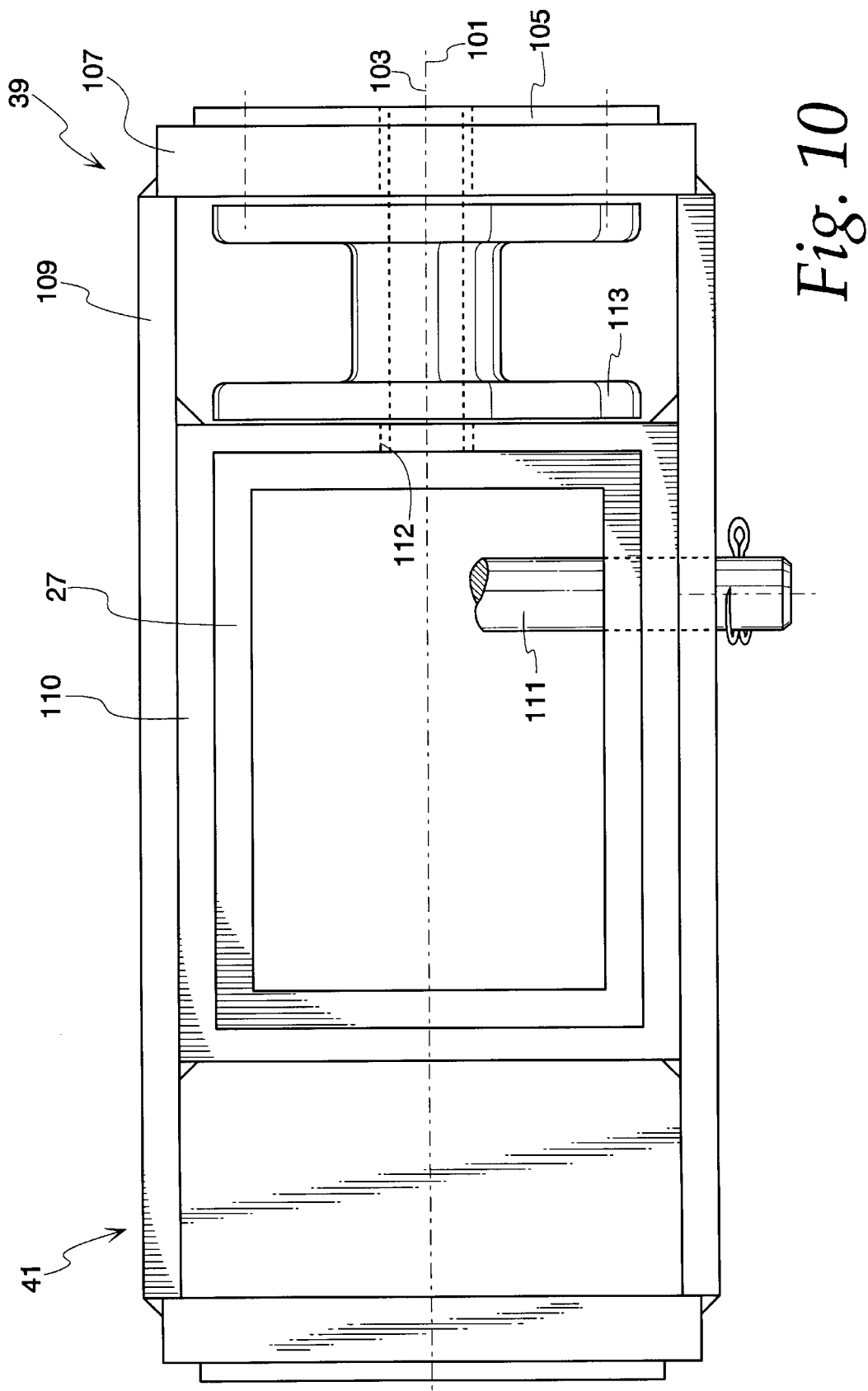
FIG. 10 is a partial top plan view of the cable drum and its mounting for the upper lift platform with some parts broken away and others indicated by labels.
Figure 11:
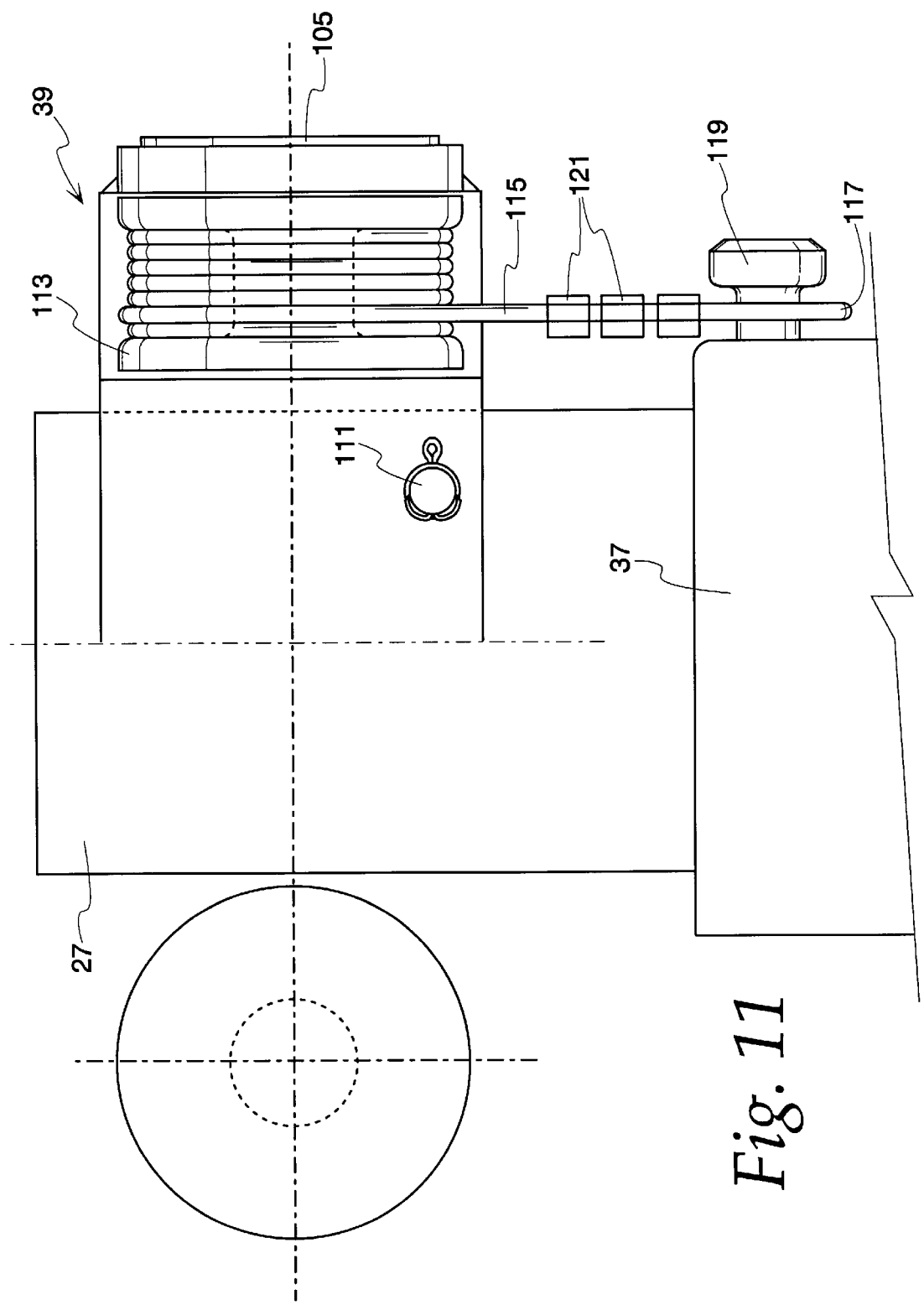
FIG. 11 is a partial front elevational view of the cable drum mounting of FIG. 10 with some parts broken away and others indicated by labels.

The platform lift mechanism 21 of this invention includes a lower movable platform 35 and an upper movable platform 37. The details of a typical platform are shown in FIG. 5 of the drawings. A hoist 39 for the upper platform 37 is shown in FIGS. 10 and 11 and a similar platform lifting hoist 41 is provided for the lower platform 35 but is not shown in detail in the drawings. Each of the platforms is slidably mounted on the main column 27 for movement up and down as controlled by its lifting mechanism. FIGS. 3 and 4 of the drawings show the mounting of the lower platform 35, which includes a sleeve 51 of U-shaped transverse cross section, telescoping over the main hoist column 27. Cam roller bearings 53 (a total of eight) are attached by nuts 55 to the sleeve 51 to bear against the outside of the main hoist column 27 as shown most clearly in FIG. 4 of the drawings. Supported on the sleeve 51 are brackets 57 which attach to the lower platform 35. The brackets are pivotally attached to the sleeve 51 by pivot pin 59 to permit the lower platform to be swung through an arc of 90° (as shown by an arrow in FIG. 3) between the vertical and the horizontal. Catches, latches or locking pins, which are not shown, can be utilized to hold the platforms in their upper and lower positions with one of the fasteners being the safety pin lock 61 indicated by a label in FIG. 1 of the drawings.

Figure 2:
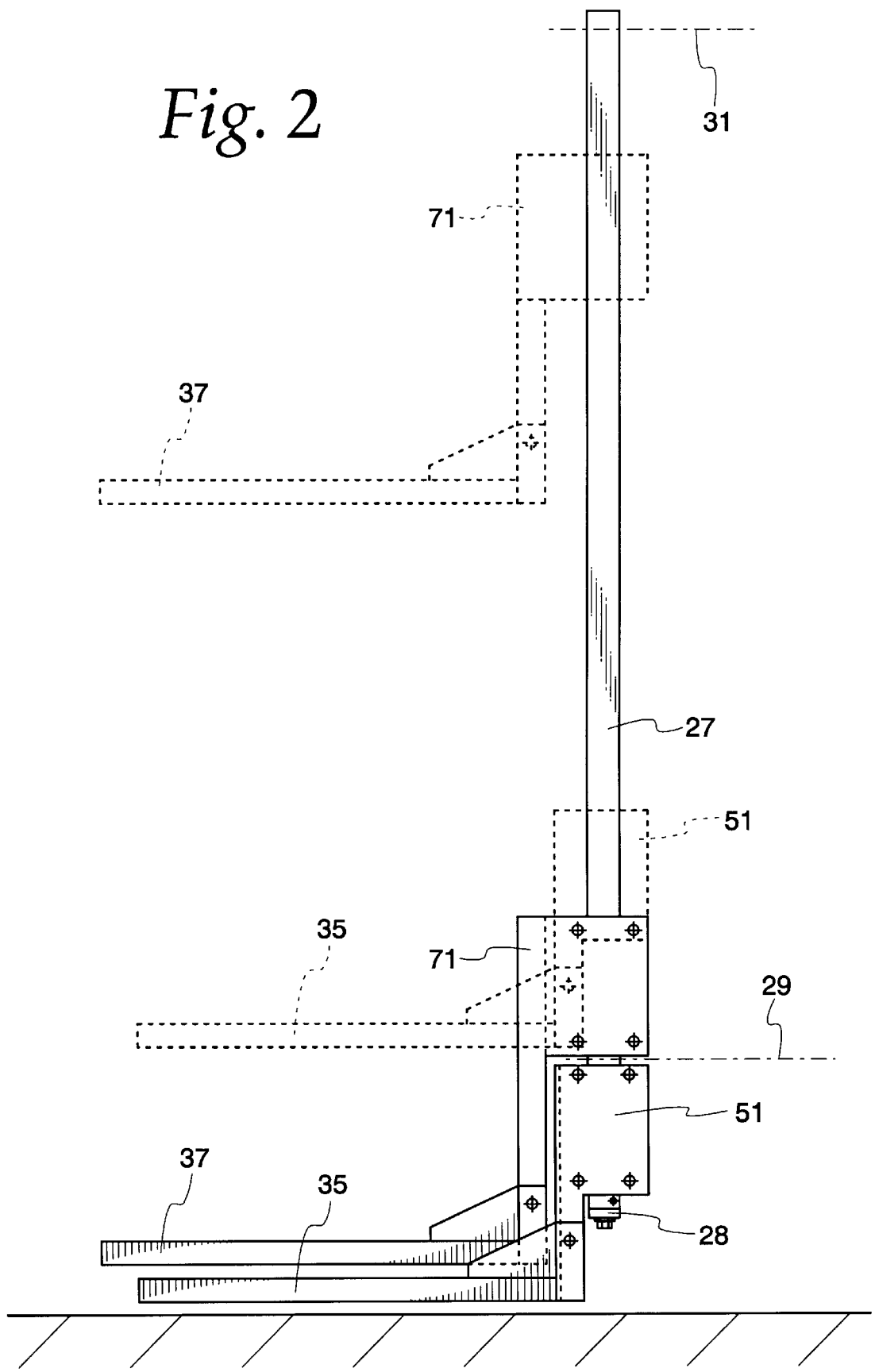
FIG. 2 is a side elevational view of the lifting mechanism of FIG. 1 with some parts omitted, other parts indicated by labels and with the elevated positions of the lift platforms shown in dashed lines.
Figure 6:
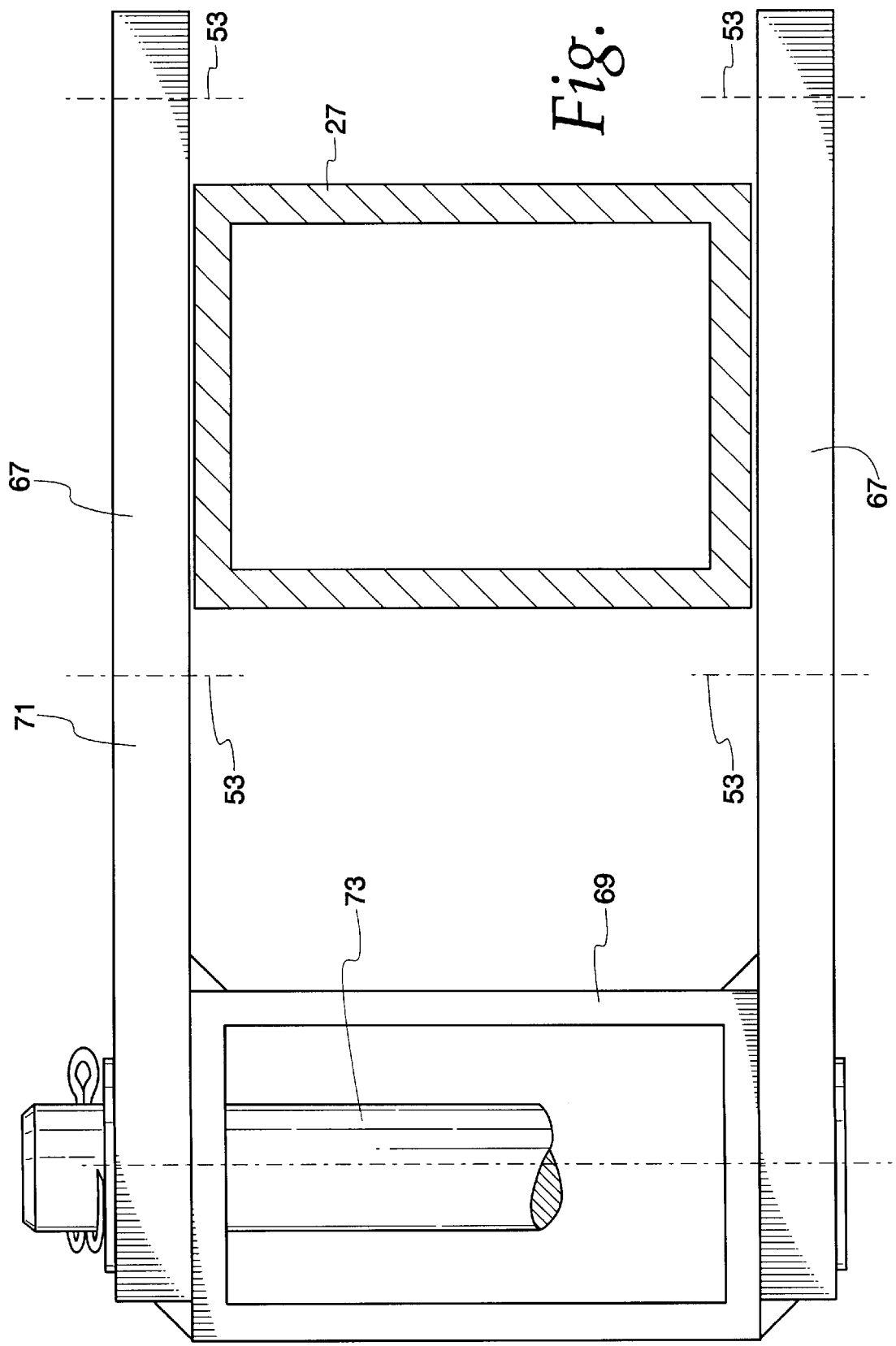
FIG. 6 is a partial top plan view similar to the view of FIG. 4 with some parts shown in cross section, other parts omitted for clarity of illustration and other parts described by labels with the view showing the mounting of the top carrier to the main column of the lift mechanism.

The upper platform 37 is mounted for vertical movement on the main column 27 by means of a modified sleeve 71 shown in detail in FIG. 6 of the drawings. This sleeve is also somewhat U-shaped having side plates 67 joined by a box section 69. Cam roller bearings 53 (a total of eight) are mounted on the side plates in engagement with the walls of the main column 27. The modified sleeve 71 has a longer forward extension than the sleeve 51 to leave a greater space between the cam roller bearings 53 and the pivot shaft 73 which connect to the brackets 75 shown in FIG. 1 of the drawings. This additional space allows the sleeve 71 of the upper platform 37 to nest on top of the lower platform 35 as shown in FIG. 2 of the drawings.

Figure 7:
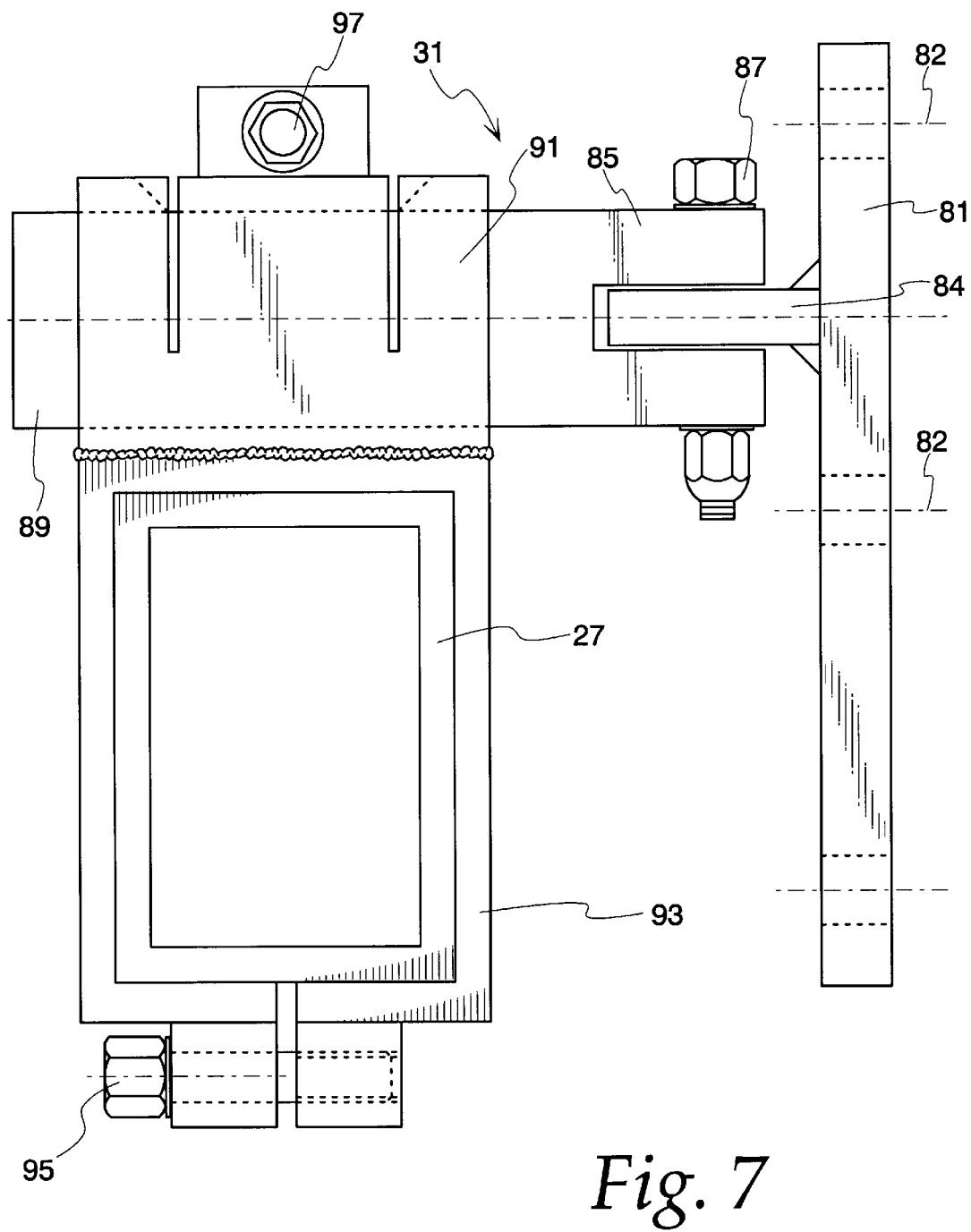
FIG. 7 is a partial top plan view showing the attachment of the top of the main hoist column to the rear wall of the motor home.
Figure 8:
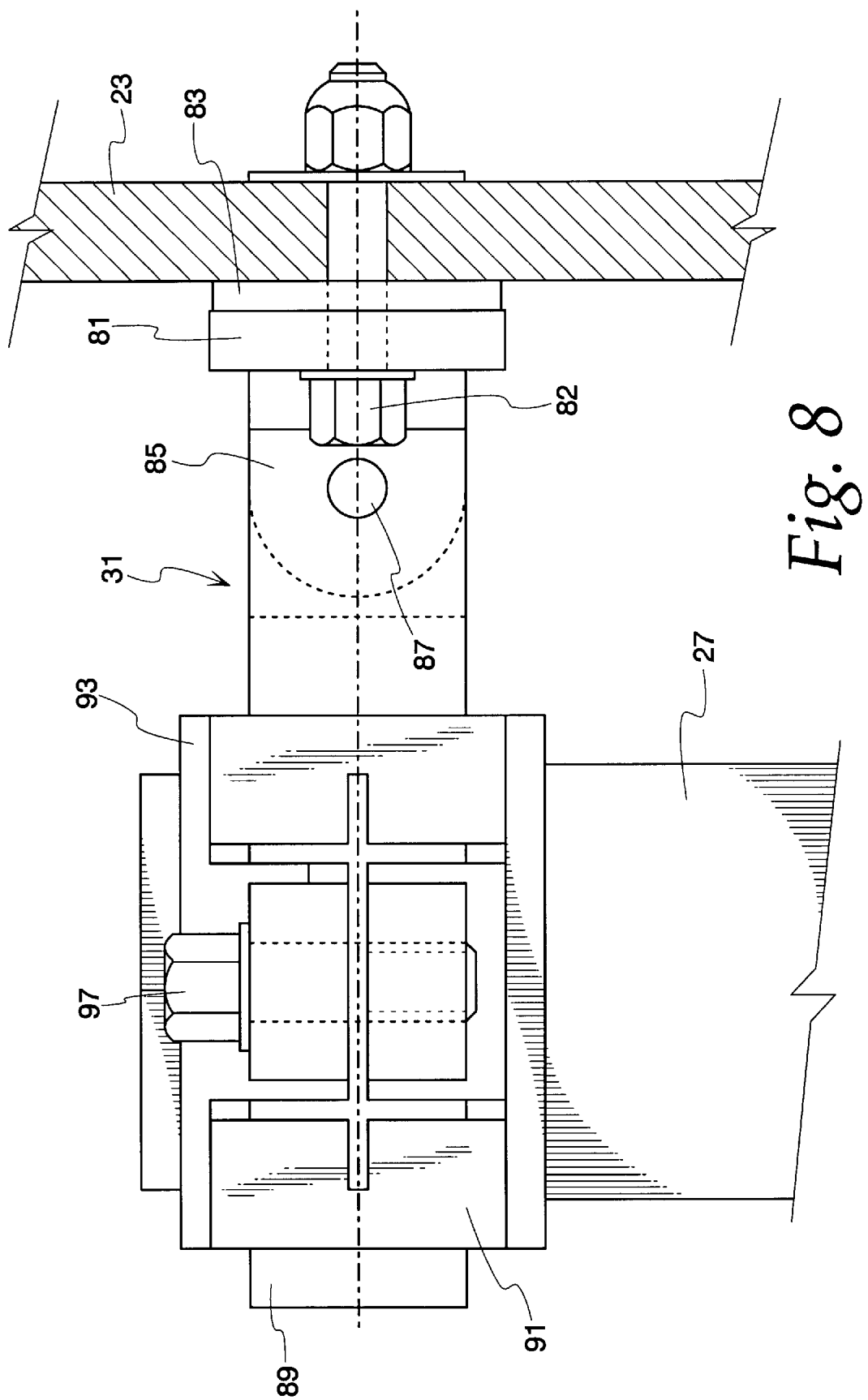
FIG. 8 is a partial side elevational view of the mechanism of FIG. 7 showing the attachment of the top of the main hoist column to the rear wall of the motor home with some parts broken away.

The details of the top mount 31 are shown in FIGS. 7 and 8 of the drawings. The top mount includes a plate 81 which is fastened to the rear wall 23 of the motor home by bolts 82. A rubber gasket 83 may also be provided between the plate 81 and rear wall 23 of the motor home. An eye 84 extending outwardly from the plate 81 fits into a clevis 85 and is held by a threaded bolt 87. The outward end of the clevis 85 terminates in a cylinder 89. A slotted collapsible cylindrical sleeve 91 telescopes over the cylinder 89. Formed with the sleeve 91 is a rectangular sleeve 93 sized to fit over the exterior of the main column 27 as shown in FIG. 7 of the drawings. The rectangular sleeve 93 has a slit in its wall which is located opposite to the wall forming its attachment to the cylindrical sleeve 91 making it adjustable through the use of a tightening bolt 95 shown in FIG. 7. The collapsible sleeve 91 allows for its adjustable slidable movement along the cylinder 89 and the sleeve 91 is formed with a tightening bolt 97 for locking the sleeve in position.

The hoisting lift 39 for the upper platform 37 is shown in FIGS. 10 and 11 of the drawings. The lifting hoist 41 for the lower platform is identical in construction but is located on the opposite side of the main column 27 and is not shown for simplicity of illustration. The upper platform lifting hoist 39 includes an electric drive motor 101 (FIG. 1) having a suitable speed reduction gearing. The electric motor shaft 103 extends through a motor mounting flange 105 shown in FIGS. 10 and 11 which is attached to a wall 107 which is part of a hollow frame 109. The hollow frame includes a rectangular sleeve 110 which telescopes over the main column 27 and is held to the main column 27 by a lock-in place pin 111 shown in FIGS. 10 and 11 of the drawings. A bearing socket 112 is formed in the rectangular sleeve 110 to receive the outer end of the electric motor shaft 103. A cable reel drum 113 is mounted on the motor shaft 103 and is positioned between the rectangular sleeve 110 and the wall 107 of the hollow frame 109. An aircraft type cable 115 is wound around the drum 113 and is looped at 117 around a cable lifting bolt 119 attached to the upper platform 37. The loop is closed by cable clamps 121.

The lower platform 35 is shown in detail in FIG. 5 of the drawings but it should be understood and appreciated that the upper platform 37 may be manufactured in a similar manner. The lower platform 35 includes an outer frame consisting of 1+"×1½" angle irons 131. Extending fore and aft at the center of the frame formed by the angle irons are a pair of square tubing supports 133 which are welded to the brackets 57. A metal mesh decking 135 is supported on the square tubing supports 133 and angle irons 131. A transversely extending channel 137 is supported on the decking and tubing and angle irons to provide support for motor vehicles. As shown in view "B" of FIG. 5, a turned up tire stop 139 may be formed at each end of the channel 137, one of which may be adjustably fixed to the channel to accommodate vehicles of different lengths. Although not shown in the drawings, it is contemplated that a removable cover, either rigid or flexible, may be attached to the platform to protect the items on the platform from the elements.

Figure 9:
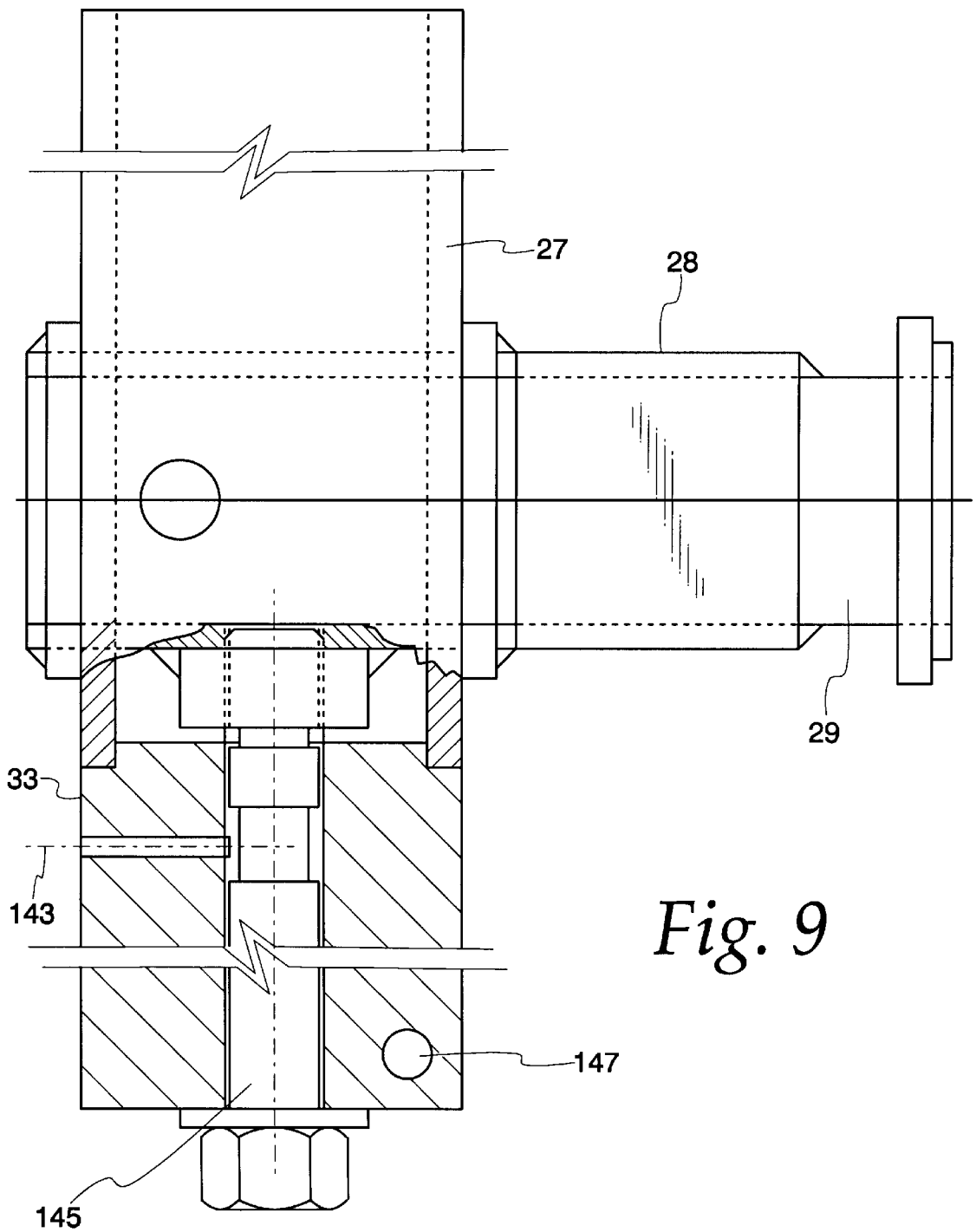
FIG. 9 is a partial side elevational view of the main hoist column extension located at the bottom of the trailer hitch with some parts broken away and others shown in cross section.

FIG. 9 of the drawings shows the main column 27 bottom extension 33 which is fastened to the under surface of the tubular extension 28 by a bolt and nut arrangement 145. A set screw 143 may be used to limit movement of the bolt 145. A laterally extending pin 147 is located in the main column bottom extension to limit lower movement of the lower platform sleeve 51. The extension permits the lower platform to be lowered to the ground. A ramp may extend from the platform allowing a motor scooter to be pushed up the ramp and onto the platform. The lifting hoist motor is then activated to raise the platform to its traveling position shown in dotted lines in FIG. 2.

We claim:

1. A lift mechanism for mounting on the back of a motor vehicle having a trailer hitch, said lift mechanism including:
   a rearwardly extending tube mounted on said trailer hitch,
   a main hoist column upstanding on said rearwardly extending tube,
   said main hoist column having an upper end, said upper end being attached to said back of said motor vehicle,
   a first platform and a second platform mounted on said main hoist column for vertical movement upwardly and downwardly along the main hoist column, with said second platform being positioned above said first platform, and
   a platform raising and lowering mechanism supported on said main hoist column.

2. The lift mechanism of claim 1 in which said second platform nests on top of said first platform when said first and second platforms are moved to their lowest positions relative to said main hoist column.

3. The lift mechanism of claim 1 in which said first platform and said second platform are each pivotally mounted for movement between horizontal and vertical positions.

4. The lift mechanism of claim 1 in which said first platform and said second platform are each supported on a sleeve which sleeves are guided by rollers for vertical movement along the main hoist column.

5. The lift mechanism of claim 1 in which said platform raising and lowering mechanism includes an electric motor, a drum driven by said electric motor and a cable wrapped around said drum, said cable having an end attached to said platform.

6. The lift mechanism of claim 1 in which a raising and lowering mechanism is provided for each of said first and said second platforms.

7. The lift mechanism of claim 6 in which each of said raising and lowering mechanisms includes an electric motor, a drum driven by said electric motor, a cable wound around said drum, said cable having an end connected to its respective platform.

8. The lift mechanism of claim 1 in which said main hoist column has a lower end resting on said rearwardly extending tube, a removable columnar extension is attached to said rearwardly extending tube, and said removable columnar extension extends downwardly therefrom to provide a lower extension for said main hoist column.

9. A lift mechanism for mounting on the back of a motor vehicle having a trailer hitch, said lift mechanism including:

a rearwardly extending tube mounted on said trailer hitch, a main hoist column upstanding on said rearwardly extending tube, said main hoist column having an upper end;

a top mount having first and second ends connected to the upper end of the main hoist column and the back of the motor vehicle, respectively, to attach said upper end to said back of said motor vehicle, so said upper end of said main hoist column is adjustably mounted relative to said back of said motor vehicle to permit movement of said upper end of said main hoist column toward and away from said back of said motor vehicle;

at least one platform mounted on said main hoist column for vertical movement upwardly and downwardly along the main hoist column, and a platform raising and lowering mechanism supported on said main hoist column.

10. The lift mechanism of claim 9 in which said upper end of said main hoist column is connected to said back of said motor vehicle by a cylinder which is pivotally attached to said back of said motor vehicle and a clampable sleeve which can be slid along said cylinder and clamped at a selected position along said cylinder.

11. A lift mechanism for mounting on the back of a motor vehicle having a trailer hitch, said lift mechanism including:

an upstanding main hoist column having a lower end connected to the trailer hitch and an upper end attached to the back of the motor home;

first and second platforms mounted on the main hoist column for vertical movement upwardly and downwardly along the main hoist column; and a platform raising and lowering mechanism mounted on the main hoist column.

12. The lift mechanism of claim 11 in which said second platform nests on top of said first platform when said first and second platforms are moved to their lowest positions relative to said main hoist column.

13. The lift mechanism of claim 11 in which at least one of said platforms is pivotally mounted for movement between a horizontal position and a vertical position.

14. The lift mechanism of claim 11 in which said first platform and said second platform are each supported on a sleeve which sleeves are guided by rollers for vertical movement along the main hoist column.

15. The lift mechanism of claim 11 in which a raising and lowering mechanism is provided for each of said first and said second platforms.

16. The lift mechanism of claim 15 in which each of said raising and lowering mechanisms includes an electric motor, a drum driven by said electric motor, a cable wound around said drum, said cable having an end connected to its respective platform.

* * * * *